(12) United States Patent
Zhang

(10) Patent No.: US 9,733,553 B2
(45) Date of Patent: Aug. 15, 2017

(54) INFORMATION PROCESSING METHOD FOR ADJUSTING ELECTRONIC DEVICE WITH PROJECTION FUNCTION AND ELECTRONIC DEVICE WITH PROJECTION FUNCTION

(71) Applicant: Lenovo (Beijing) Co., Ltd., Beijing (CN)

(72) Inventor: Xiaodan Zhang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 92 days.

(21) Appl. No.: 14/709,941

(22) Filed: May 12, 2015

(65) Prior Publication Data

US 2016/0191876 A1   Jun. 30, 2016

(30) Foreign Application Priority Data

Dec. 29, 2014   (CN) .......................... 2014 1 0848473

(51) Int. Cl.
| | | |
|---|---|---|
| G03B 21/14 | (2006.01) | |
| H04N 9/31 | (2006.01) | |
| G06F 1/16 | (2006.01) | |

(52) U.S. Cl.
CPC .............. *G03B 21/14* (2013.01); *G06F 1/16* (2013.01); *H04N 9/3185* (2013.01); *H04N 9/3194* (2013.01)

(58) Field of Classification Search
CPC ...... G06F 1/16; H04N 9/3185; H04N 9/3194; G03B 21/14
See application file for complete search history.

(56) References Cited

U.S. PATENT DOCUMENTS

2002/0021418 A1* 2/2002 Raskar ................... G03B 21/00
                                                                 353/69
2007/0263176 A1* 11/2007 Nozaki ................... G03B 29/00
                                                                 353/69
(Continued)

FOREIGN PATENT DOCUMENTS

CN         101006708 A        7/2007
CN         103206946 A        7/2013

OTHER PUBLICATIONS

Office Action, and English language translation thereof, in corresponding Chinese Application No. 201410848473.7, dated Apr. 1, 2017, 14 pages.

*Primary Examiner* — Sultan Chowdhury
*Assistant Examiner* — Magda Cruz
(74) *Attorney, Agent, or Firm* — Brinks Gilson & Lione; G. Peter Nichols

(57) ABSTRACT

An information processing method applied to an electronic device having a projection assembly and a position-orientation sensor configured to detect position-orientation information of the electronic device is described. The method includes determining whether the electronic device is in a projection mode to obtain a first determination result; acquiring position-orientation information of the electronic device as detected by the position-orientation sensor when the first determination result indicates that the electronic device is in a projection mode; generating an adjustment line based on the position-orientation information; acquiring a preset reference line; and displaying the adjustment line and the reference line in a projected screen, to assist a user in adjusting the adjustment line to coincide with the reference line.

12 Claims, 11 Drawing Sheets

(56) References Cited

U.S. PATENT DOCUMENTS

| | | | |
|---|---|---|---|
| 2011/0216288 A1* | 9/2011 | Rutledge | H04N 9/3185 |
| | | | 353/70 |
| 2014/0285778 A1* | 9/2014 | Inoue | H04N 9/3185 |
| | | | 353/70 |
| 2014/0295915 A1* | 10/2014 | Zhong | H04M 1/0245 |
| | | | 455/556.1 |
| 2014/0307265 A1* | 10/2014 | Yamagiwa | G01B 11/14 |
| | | | 356/614 |

* cited by examiner

INFORMATION PROCESSING METHOD FOR ADJUSTING ELECTRONIC DEVICE WITH PROJECTION FUNCTION AND ELECTRONIC DEVICE WITH PROJECTION FUNCTION This application claims priority to Chinese patent application No. 201410848473.7 filed on Dec. 29, 2014; the entire contents of which is incorporated herein by reference.

The present application relates to the field of electronic technique, and more particularly, to an information processing method and an electronic device.

BACKGROUND

Currently, some electronic devices such as tablet computer, smart phone and so on all have a projection function, a projection assembly is provided in these electronic devices having the projection function, so that the user can use these electronic devices to achieve the projection function. When using the projection function, the user can directly project an interface displayed on an electronic device having the projection function onto a wall, a desktop, or a projector screen, see FIG. 1-1, the tablet computer can project its display interface onto a wall. When using the projection function, the user can also connect one electronic device having the projection function to another electronic device that generally has a larger display screen, for example, a smart phone having the projection function can be connected to an LCD TV, so that a display interface of the smart phone is displayed via the LCD TV, as such, the user projects the display interface onto a larger display screen, which can get better visual viewing experience.

However, due to shape limits of the mobile phone or tablet computer and other electronic devices per se, it needs to adopt a holder or other means to support during the projection; and the user needs to manually adjust the projected screen to maintain the projected screen horizontal, such manual adjustment manner depends on personal viewing locations, usage preferences etc., it is troublesome and is apt to cause error.

SUMMARY

In view of the above, embodiments of the present application provide an information processing method and an electronic device to solve at least one problem existing in the prior art, the provided information processing method and electronic device can assist a user in adjusting display of a screen, and thereby enhance user experience.

The technical solutions of embodiments of the present application are implemented as below.

In a first aspect, an embodiment of the present application provides an information processing method applied to an electronic device having a projection assembly and a position-orientation sensor configured to detect position-orientation information of the electronic device, the method comprising:

determining whether the electronic device is in a projection mode to obtain a first determination result;

acquiring position-orientation information of the electronic device as detected by the position-orientation sensor when the first determination result indicates that the electronic device is in a projection mode;

generating an adjustment line based on the position-orientation information;

acquiring a preset reference line; and displaying the adjustment line and the reference line in a projected screen, to assist a user in adjusting the adjustment line to coincide with the reference line.

In a second aspect, an embodiment of the present application provides an electronic device, comprising a projection assembly and a position-orientation sensor configured to detect position-orientation information of the electronic device, the electronic device comprises a determining unit, a first acquiring unit, a generating unit, a second acquiring unit, and a display unit, wherein:

the determining unit is configured to determine whether the electronic device is in a projection mode to obtain a first determination result;

the first acquiring unit is configured to acquire position-orientation information of the electronic device as detected by the position-orientation sensor when the first determination result indicates that the electronic device is in a projection mode;

the generating unit is configured to generate an adjustment line based on the position-orientation information;

the second acquiring unit is configured to acquire a preset reference line; and the display unit is configured to display the adjustment line and the reference line in a projected screen, to assist a user in adjusting the adjustment line to coincide with the reference line.

By means of determining whether the electronic device is in a projection mode to obtain a first determination result; acquiring position-orientation information of the electronic device as detected by the position-orientation sensor when the first determination result indicates that the electronic device is in a projection mode; generating an adjustment line based on the position-orientation information; acquiring a preset reference line; and displaying the adjustment line and the reference line in a projected screen, to assist a user in adjusting the adjustment line to coincide with the reference line, the information processing method and the electronic device provided by the embodiments of the present application can help the user adjust the display of the screen rapidly, and thereby enhance user experience.

BRIEF DESCRIPTION OF THE DRAWINGS

FIG. 1-2 is a first schematic diagram of usage mode of an electronic device in the prior art;

FIG. 1-3 is a second schematic diagram of usage mode of an electronic device in the prior art;

FIG. 1-4 is a third schematic diagram of usage mode of an electronic device in the prior art;

FIG. 2-1 is a schematic diagram of a light exit location of a projection assembly in the prior art;

FIG. 2-2 is a schematic diagram of projection of the projection assembly in a correct usage mode in the prior art;

FIG. 2-3 is a schematic diagram of projection of the projection assembly in an incorrect usage mode in the prior art;

FIG. 2-4 is a schematic diagram of projection of the projection assembly in an incorrect position-orientation in the prior art;

FIG. 3-1 is a schematic diagram of flowchart of implementation of an information processing method in a first embodiment of the present application;

FIG. 3-2 is a schematic diagram of relationship between a reference line and an adjustment line in the first embodiment of the present application;

FIG. 4-1 is a schematic diagram of flowchart of implementation of an information processing method in a second embodiment of the present application;

FIG. 4-2 is a schematic diagram of forming process of a reference line in the second embodiment of the present application;

FIG. 6-1 is a schematic diagram of flowchart of implementation of an information processing method in a fourth embodiment of the present application;

FIG. 6-2 is a schematic diagram of relationship between a reference line and an adjustment line in the fourth embodiment of the present application;

DETAILED DESCRIPTION

Figure 1:
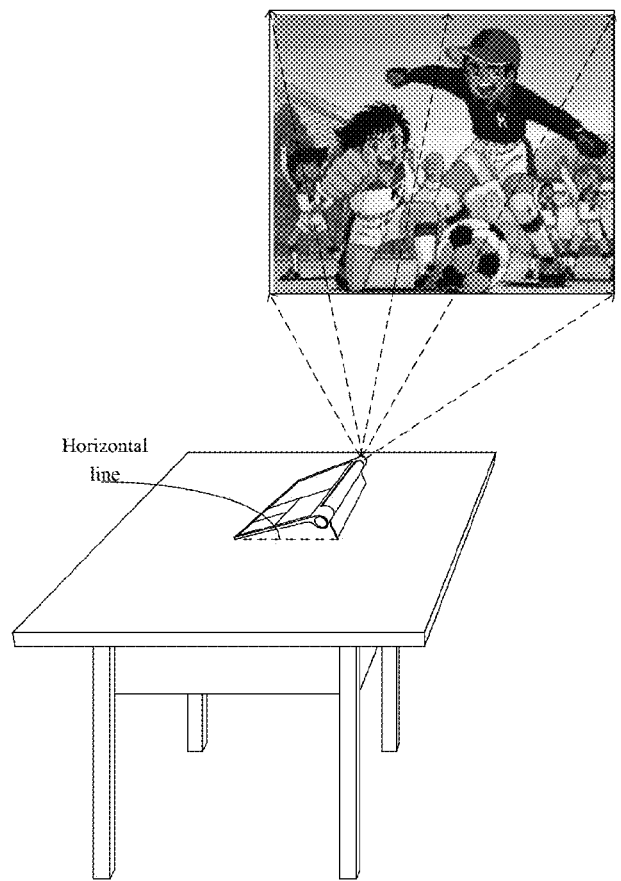
FIG. 1-1 is a schematic diagram of a scene in the prior art.
Figures 1, 2:
Figures 1, 2, 3:
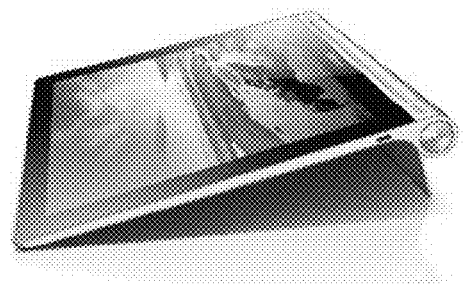
Figures 1, 2, 3, 4:
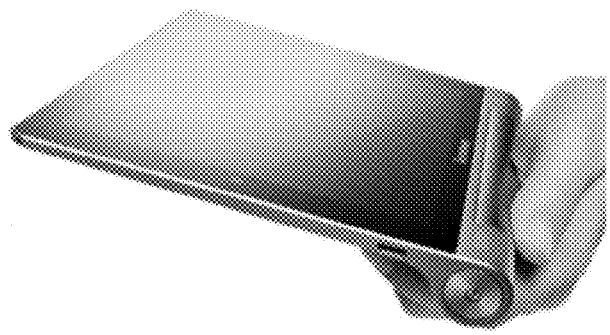
Figures 1, 2:
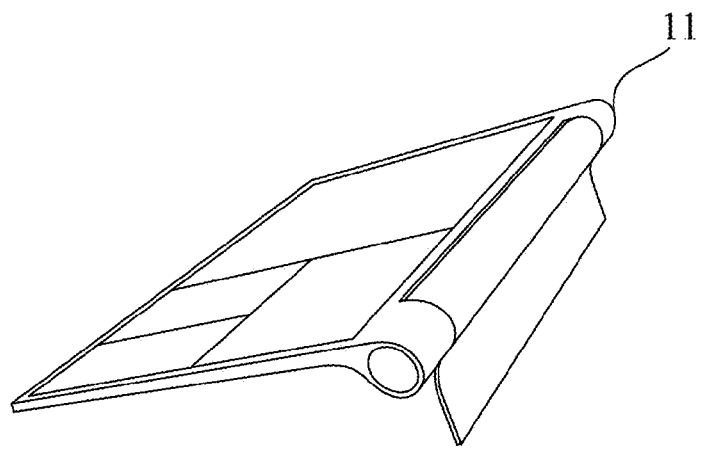
Figure 2:
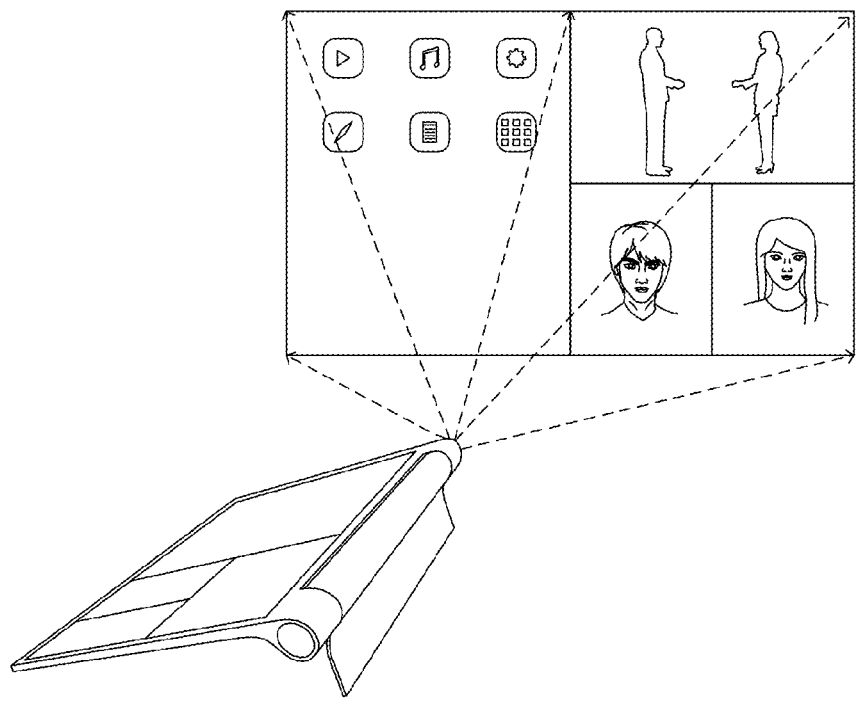
Figures 2, 3:
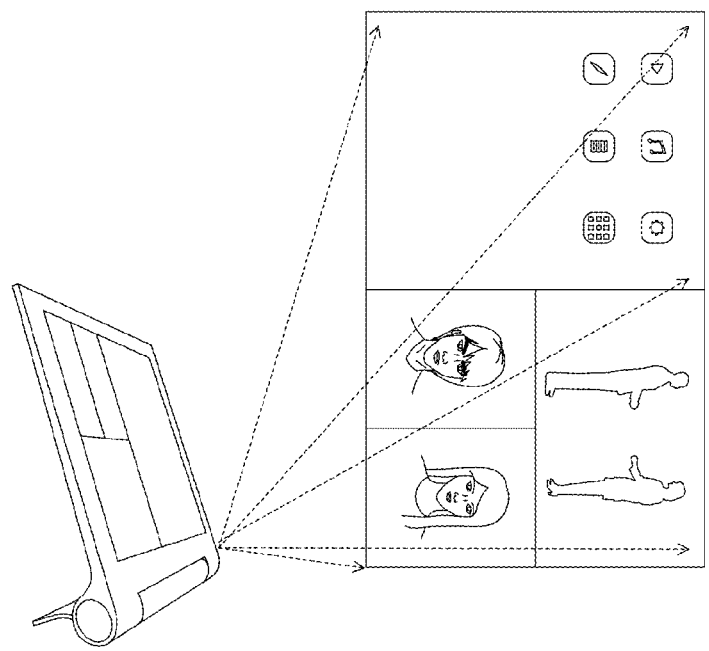
Figures 2, 3, 4:
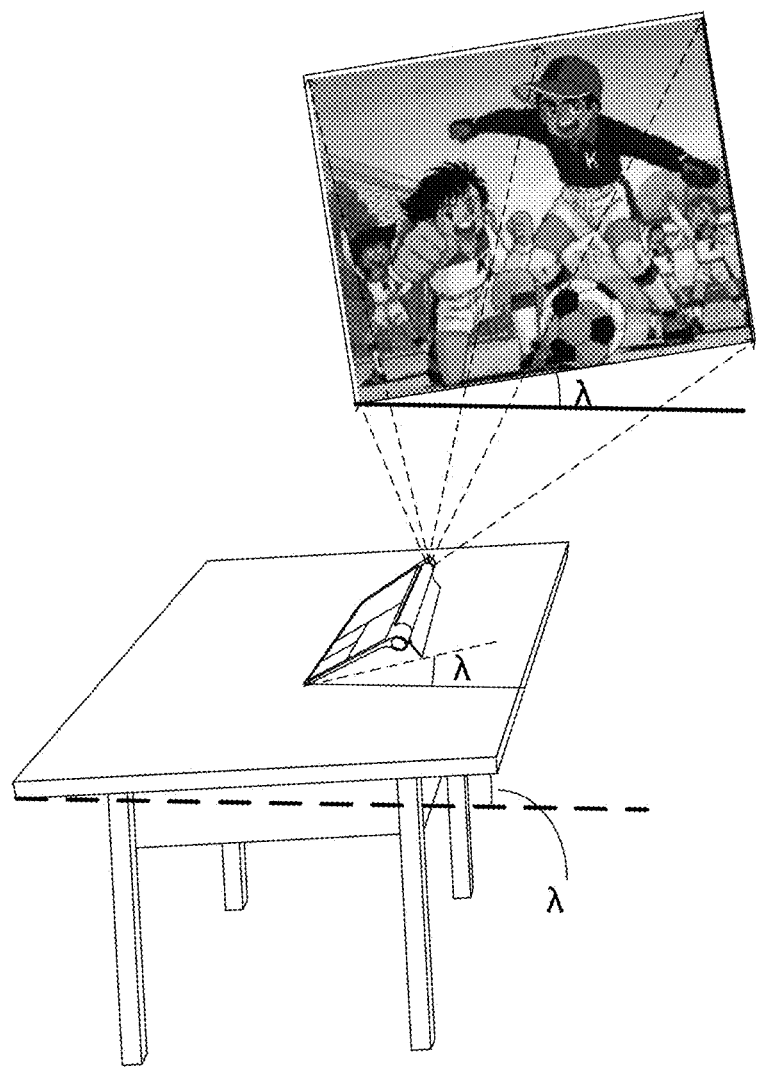
Figures 1, 3:
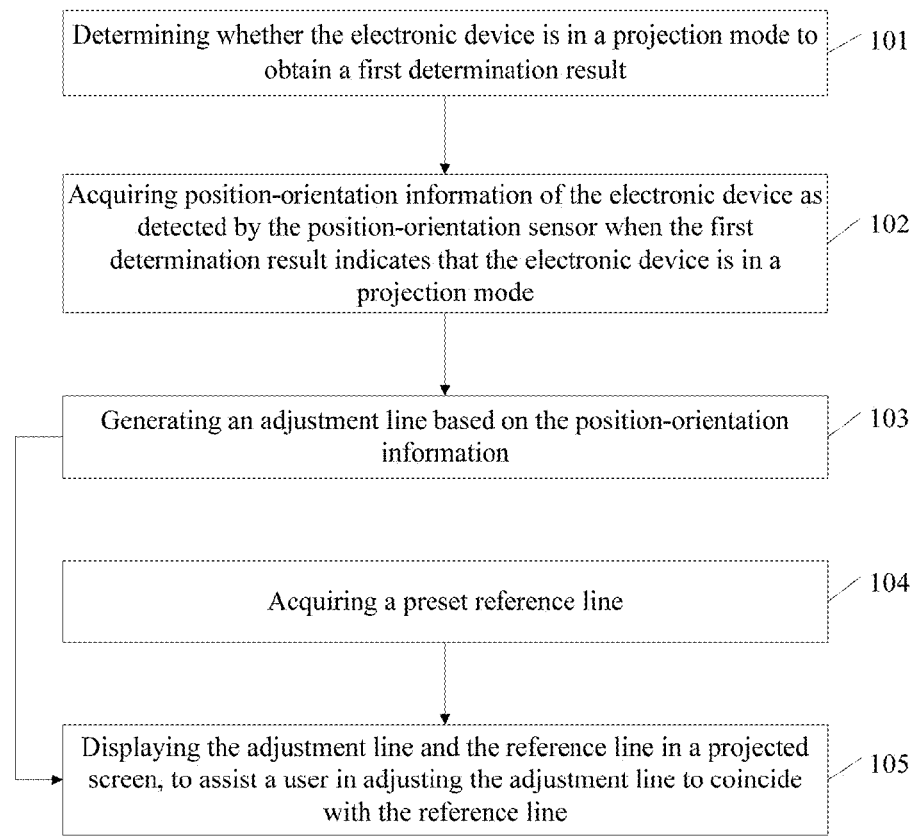
Figures 2, 3:
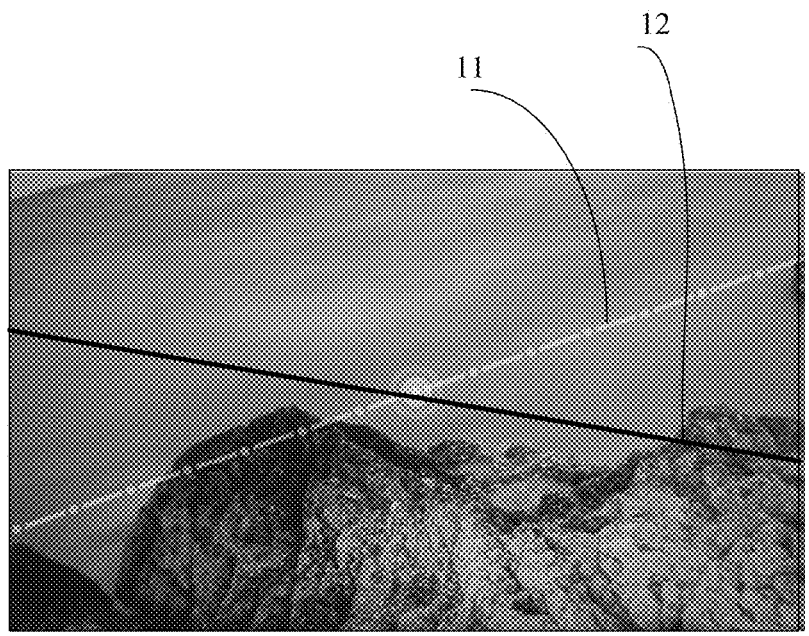
Figures 1, 4:
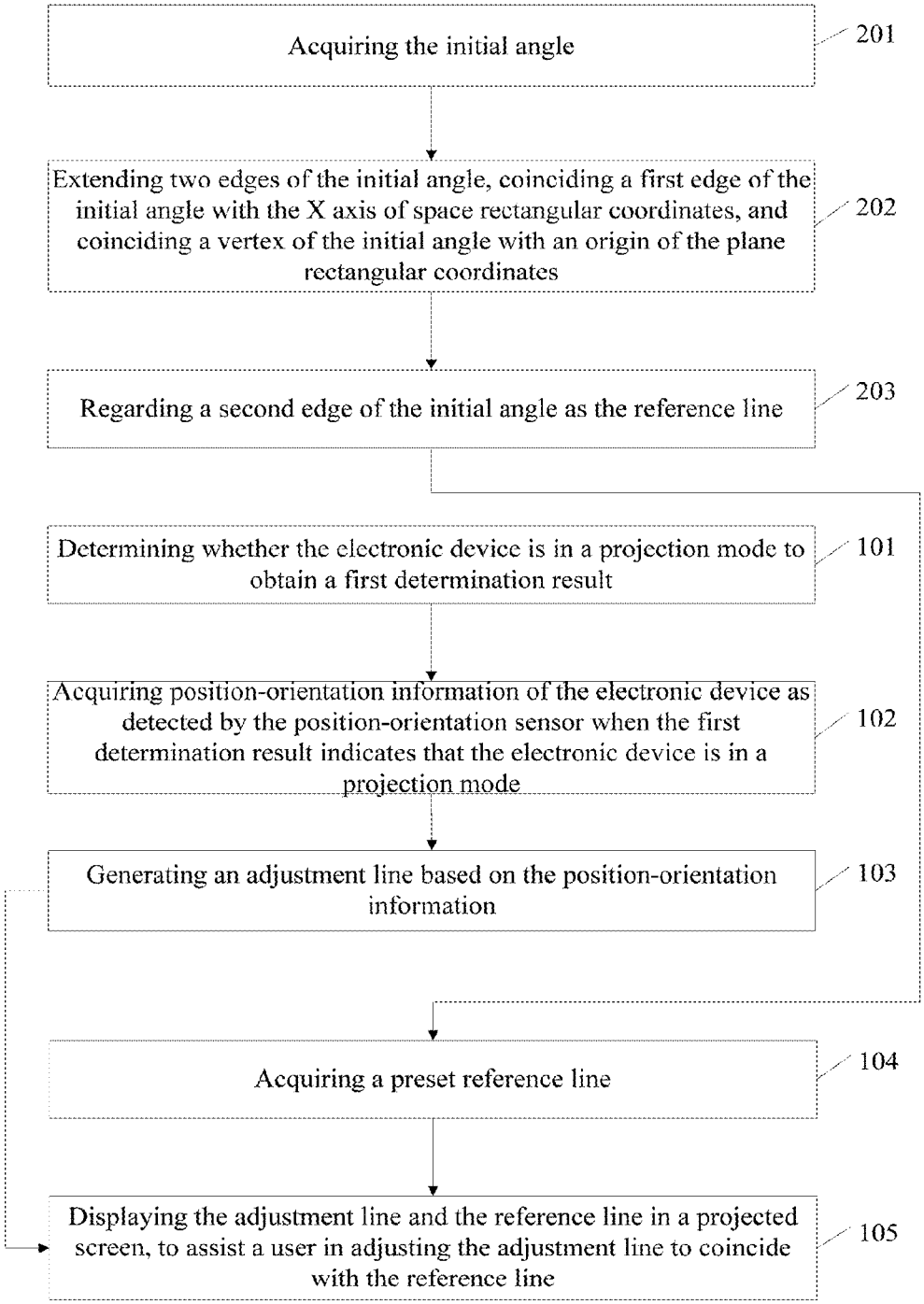
Figures 2, 4:
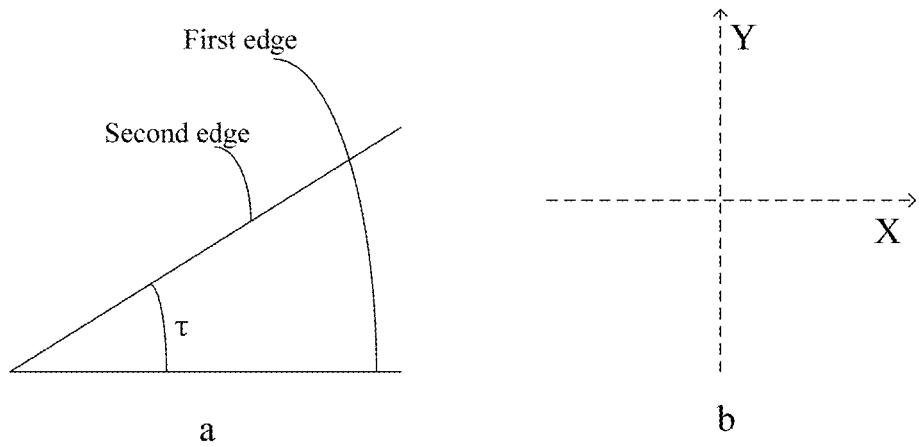

Hereinafter, the technical problem involved in the BACKGROUND of the present application will be explained with the tablet computer as an example reprehensive of the electronic device. A projection assembly is provided within the tablet computer having a projection function, the projection assembly at least comprises a projection lens. Once the projection assembly and a drive software for invoking the projection assembly to operate are set according to standards required for qualified products, a manufacturer will specify, in a handbook of the tablet computer, a method of using the projection function in the tablet computer, for example, the tablet computer has a variety of usage modes, like a standing mode as shown in FIG. 1-2, a touch mode as shown in FIG. 1-3, a read mode shown in FIG. 1-4. It is assumed that the light exit location of the projection assembly of the tablet computer is at an end 11 of a rotating shaft as shown in FIG. 2-1, this tablet computer cannot always achieve an optimal effect of the projection function in each usage mode, for example, this tablet computer is designed for the user to use the projection assembly in a touch mode, as shown in FIG. 2-2, this tablet computer can make a good use of the projection function in the touch mode, and thereby obtain a better projected screen; however, when the user uses the projection function in a standing mode, the projection effect is unsatisfactory, as shown in FIG. 2-3, the projected screen in this case has a rotation with an angle of, for example, 90 degrees clockwise as compared with the projected screen in the touch mode. The handbook of this tablet computer further specifies that better projection effect can be obtained when the tablet computer is in the touch mode and placed on a horizontal contact surface. As shown in FIG. 2-4, the tablet computer is used in the touch mode, but the contact surface on which the tablet computer is placed is not horizontal, thus resulting in that the projected screen is not horizontal either. Accordingly, when using the projection function in different usage modes, projection area of the projection assembly may probably generate rotation, slant along with the current position-orientation of the electronic device, this causes great inconvenience to the viewing of the user.

The technical solutions of the present application will be further described in detail below in conjunction with the accompany drawings and the concrete embodiments.

First Embodiment

This embodiment of the present application provides an information processing method applied to an electronic device, functions achieved by the information processing method can be implemented by invoking program codes by a processor in the electronic device, of course, the program codes may be stored in a storage medium of the computer. It should be noted that, besides the processor and the storage medium, the electronic device further comprises a projection assembly and a position-orientation sensor configured to detect position-orientation information of the electronic device. In this embodiment of the present application, the electronic device covers smart phone, tablet computer, notebook computer, desktop computer, table computer, multimedia player, navigation system, personal digital assistant and others.

FIG. 3-1 is a schematic diagram of flowchart of implementation of an information processing method in a first embodiment of the present application, as shown in FIG. 3-1, the method comprising:

Step 101, determining whether the electronic device is in a projection mode to obtain a first determination result.

Herein, the projection mode refers to that the user turns on the projection function of the electronic device, when turning on the projection function, projection members on the electronic device can project the display content of the electronic device in the form of image, in particular, it is possible to project onto a wall, a tabletop, a floor, a screen and so on.

Step 102, acquiring position-orientation information of the electronic device as detected by the position-orientation sensor when the first determination result indicates that the electronic device is in a projection mode.

Herein, determining whether the electronic device is in a projection mode to obtain a first determination result may comprise acquiring first information, determining whether it is in a projection mode based on the first information, to obtain a first determination result, wherein the first information is used to indicate whether the user turns on the projection function. When the first information indicates that the user turns on the projection function, it is determined that the electronic device is in a projection mode, that is, the first determination result indicates that the electronic device is in a projection mode; when the first information indicates that the electronic device does not turn on the projection function, it is determined that the electronic device is not in a projection mode, that is, the first determination result indicates that the electronic device is not in a projection mode. In a specific implementation, it is possible to implement turning on the projection function in manners of switch button, voice control, selecting by a touch operation.

Herein, determining whether the electronic device is in a projection mode to obtain a first determination result may comprise determining whether the electronic device revokes an application for driving the projection assembly, to obtain a determination result; when the first determination result indicates that the electronic device invokes an application for driving the projection assembly, it shows that the electronic device is in a projection mode; when the first determination result indicates that the electronic device does not invoke an application for driving the projection assembly, then it shows that the electronic device is not in a projection mode.

Herein, the position-orientation information is used to indicate position and/or orientation information of the electronic device, and may be indicated by adopting angle information, those skilled in the art may also adopt other relevant information to indicate the position-orientation information, no more details repeated here.

Step 103, generating an adjustment line based on the position-orientation information.

Herein, the adjustment line is used to represent current position-orientation information of the electronic device.

Step 104, acquiring a preset reference line.

Herein, the reference line is associated with an initial angle and used to represent a straight line which serves as a standard generated when the electronic device is in a set position-orientation, wherein the initial angle is an angle between a projection lens in the projection assembly and a horizontal plane.

Step 105, displaying the adjustment line and the reference line in a projected screen, to assist a user in adjusting the adjustment line to coincide with the reference line.

The technical solution provided by this embodiment of the present application may be applied to the following scenarios. FIG. 3-2 is a schematic diagram of relationship between a reference line and an adjustment line in the first embodiment of the present application, as shown in FIG. 3-2, the preset reference line is a black solid line 12, the generated adjustment line is a white dotted lines 11, when the user is using the projection mode of the electronic device, the electronic device 11 automatically generates the adjustment line 11 based on the current position-orientation information of the electronic device, then the user can adjust the position-orientation of the electronic device based on the adjustment line, so that the adjustment line 11 coincides with the reference line 12. During the process of adjusting the electronic device, the adjustment line 11 can move in real time based on the current position-orientation of the electronic device, the user appropriately regulates the adjustment direction based on the movement of the adjustment line 11 to coincide the adjustment line 11 with the reference line 12 as soon as possible.

It should be noted that, typically, it is possible to change the adjustment line by changing the position-orientation of the electronic device, it is assumed that the user adjusts the electronic device by moving up and down, when the user raises a side edge A1 of the electronic device (e.g., block up the side edge A1), if the adjustment line becomes farther and farther away from the reference line, then the user should lower this side edge A1, by which the adjustment line 12 becomes closer and closer to the reference line 11, until the two coincide. Based on the preceding description, as another embodiment of the present application, it is possible to generate prompt information including a direction indicator based on the reference line and the adjustment line, and the prompt information is used to prompt the user to adjust toward the direction indicated by the direction indicator, so that the adjustment line 12 and the reference line 11 coincide.

In this embodiment of the present application, the method further comprises: returning to step 101 when the first determination result indicates that the electronic device is not in a projection mode, that is, continue to determine whether the electronic device is in a projection mode.

In this embodiment of the present application, the reference line and the adjustment line may be displayed on a display screen of the electronic device, and may also be displayed in an image projected by the projection assembly.

In this embodiment of the present application, by means of determining whether the electronic device is in a projection mode to obtain a first determination result; when the first determination result indicates that the electronic device is in a projection mode, acquiring position-orientation information of the electronic device as detected by the position-orientation sensor; generating an adjustment line based on the position-orientation information; acquiring a preset reference line; displaying the adjustment line and the reference line in a projected screen, to assist a user in adjusting the adjustment line to coincide with the reference line, it can help the user adjust the display of the screen rapidly, and thereby enhance user experience.

Second Embodiment

Based on the preceding First Embodiment, this embodiment of the present application provides an information processing method applied to an electronic device, functions achieved by the information processing method can be implemented by invoking program codes by a processor in the electronic device, of course, the program codes may be stored in a storage medium of the computer. It should be noted that, besides the processor and the storage medium, the electronic device further comprises a projection assembly and a position-orientation sensor configured to detect position-orientation information of the electronic device. In this embodiment of the present application, the electronic device covers smart phone, tablet computer, notebook computer, desktop computer, table computer, a multimedia player, a navigation system, personal digital assistant and others.

FIG. 4-1 is a schematic diagram of flowchart of implementation of an information processing method in a second embodiment of the present application, as shown in FIG. 4-1, the method comprising:

Step 201, acquiring the initial angle.

Herein, the horizontal plane is set to coincide with a positive direction of an X axis of plane rectangular coordinates in a representation process of the initial angle.

Step 202, extending two edges of the initial angle, coinciding a first edge of the initial angle with the X axis of space rectangular coordinates, and coinciding a vertex of the initial angle with an origin of the plane rectangular coordinates.

Step 203, regarding a second edge of the initial angle as the reference line.

Herein, the process shown by steps 201 to 203 may make a reference to FIG. 4-2, in FIG. 4-2, a shows the initial angle τ, b shows the plane rectangular coordinates whose X axis and Y axis both are represented by dotted lines, wherein the arrow of the X axis in the plane rectangular coordinates represents a positive direction of the X axis, the arrow of the Y axis in the plane rectangular coordinates represents a positive direction of the Y axis. If it is set that the initial angle σ is a positive angle, then as shown in c of FIG. 4-3, a first edge of the initial angle σ is coincided with the X axis of the space rectangular coordinates, and a vertex of the initial angle is coincided with an origin of the plane rectangular coordinates, so that the initial angle can be denoted as a positive angle in the plane rectangular coordinates. It should be noted that, in the subsequent embodiments of the present application, besides the initial angle, other angles like first angle may also be involved, wherein the first angle is an angle considered with respect to the positive direction of the X axis, for example, it is assumed that the first angle is −20 degrees, and the initial angle is +15 degrees, then the difference between the first angle and the initial angle is 35 degrees.

Step 101, determining whether the electronic device is in a projection mode to obtain a first determination result.

Herein, the projection mode refers to that the user turns on the projection function of the electronic device, when turning on the projection function, projection members on the electronic device can project the display content of the electronic device in the form of image, in particular, it is possible to project onto a wall, a tabletop, a floor, a screen and so on.

Step 102, acquiring position-orientation information of the electronic device as detected by the position-orientation sensor when the first determination result indicates that the electronic device is in a projection mode.

Herein, the position-orientation information is used to indicate position and/or orientation information of the electronic device, and may be indicated by adopting angle information, those skilled in the art may also adopt other relevant information to indicate the position-orientation information, no more details repeated here.

Step 103, generating an adjustment line based on the position-orientation information.

Herein, the adjustment line is used to represent current position-orientation information of the electronic device.

Step 104, acquiring a preset reference line.

Herein, the reference line is associated with an initial angle and used to represent a straight line which serves as a standard generated when the electronic device is in a set position-orientation, wherein the initial angle is an angle between a projection lens in the projection assembly and a horizontal plane.

Step 105, displaying the adjustment line and the reference line in a projected screen, to assist a user in adjusting the adjustment line to coincide with the reference line.

Steps 101 to 105 in this embodiment of the present application correspond to steps 101 to 105 in the preceding First Embodiment, respectively, thus, the preceding First Embodiment may be consulted, no more details repeated here.

Third Embodiment

This embodiment of the present application provides an information processing method applied to an electronic device, functions achieved by the information processing method can be implemented by invoking program codes by a processor in the electronic device, of course, the program codes may be stored in a storage medium of the computer. It should be noted that, besides the processor and the storage medium, the electronic device further comprises a projection assembly and a position-orientation sensor configured to detect position-orientation information of the electronic device.

Figure 5:
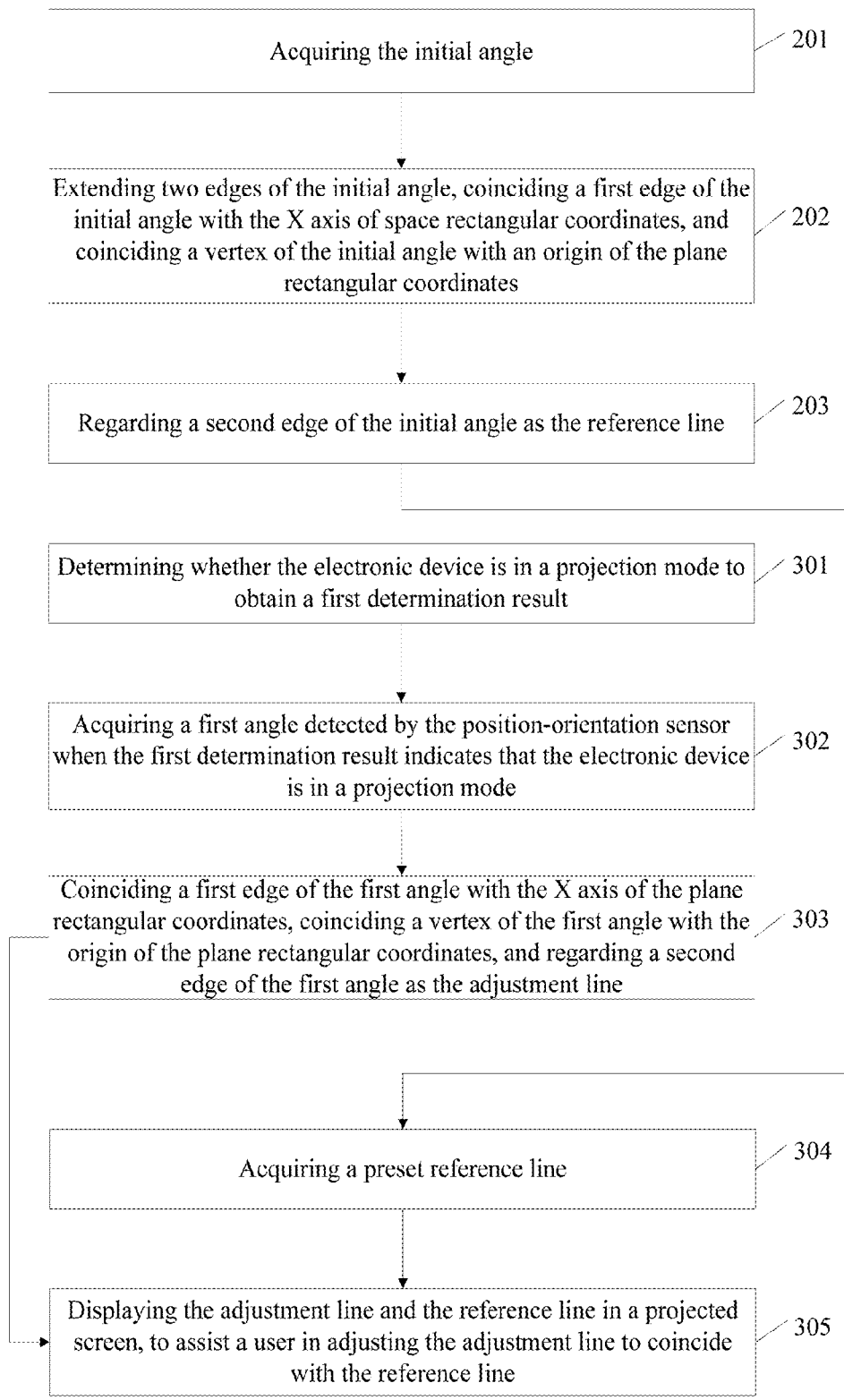
FIG. 5 is a schematic diagram of flowchart of implementation of an information processing method in a third embodiment of the present application.

FIG. 5 is a schematic diagram of flowchart of implementation of an information processing method in a third embodiment of the present application, as shown in FIG. 5, the method comprising:

Step 201, acquiring the initial angle.

Herein, the horizontal plane is set to coincide with a positive direction of an X axis of plane rectangular coordinates in a representation process of the initial angle.

Step 202, extending two edges of the initial angle, coinciding a first edge of the initial angle with the X axis of space rectangular coordinates, and coinciding a vertex of the initial angle with an origin of the plane rectangular coordinates.

Step 203, regarding a second edge of the initial angle as the reference line.

Herein, steps 201 to 203 in this embodiment of the present application correspond to steps 201 to 203 in the preceding Second Embodiment, respectively, thus, the preceding Second Embodiment may be consulted, no more details repeated here.

Step 301, determining whether the electronic device is in a projection mode to obtain a first determination result.

Herein, the projection mode refers to that the user turns on the projection function of the electronic device, when turning on the projection function, projection members on the electronic device can project the display content of the electronic device in the form of image, in particular, it is possible to project onto a wall, a tabletop, a floor, a screen and so on.

Step 302, acquiring a first angle detected by the position-orientation sensor when the first determination result indicates that the electronic device is in a projection mode.

Herein, the first angle is an angle between the electronic device and the horizontal plane.

Step 303, coinciding a first edge of the first angle with the X axis of the plane rectangular coordinates, coinciding a vertex of the first angle with the origin of the plane rectangular coordinates, and regarding a second edge of the first angle as the adjustment line.

Herein, the adjustment line is used to represent current position-orientation information of the electronic device.

Step 304, acquiring a preset reference line.

Herein, the reference line is associated with an initial angle and used to represent a straight line which serves as a standard generated when the electronic device is in a set position-orientation, wherein the initial angle is an angle between a projection lens in the projection assembly and a horizontal plane.

Step 305, displaying the adjustment line and the reference line in a projected screen, to assist a user in adjusting the adjustment line to coincide with the reference line.

Fourth Embodiment

This embodiment of the present application provides an information processing method applied to an electronic device, functions achieved by the information processing method can be implemented by invoking program codes by a processor in the electronic device, of course, the program codes may be stored in a storage medium of the computer. It should be noted that, besides the processor and the storage medium, the electronic device further comprises a projection assembly and a position-orientation sensor configured to detect position-orientation information of the electronic device. In this embodiment of the present application, the electronic device covers smart phone, tablet computer, notebook computer, desktop computer, table computer, a multimedia player, a navigation system, personal digital assistant and others.

Figures 1, 6:
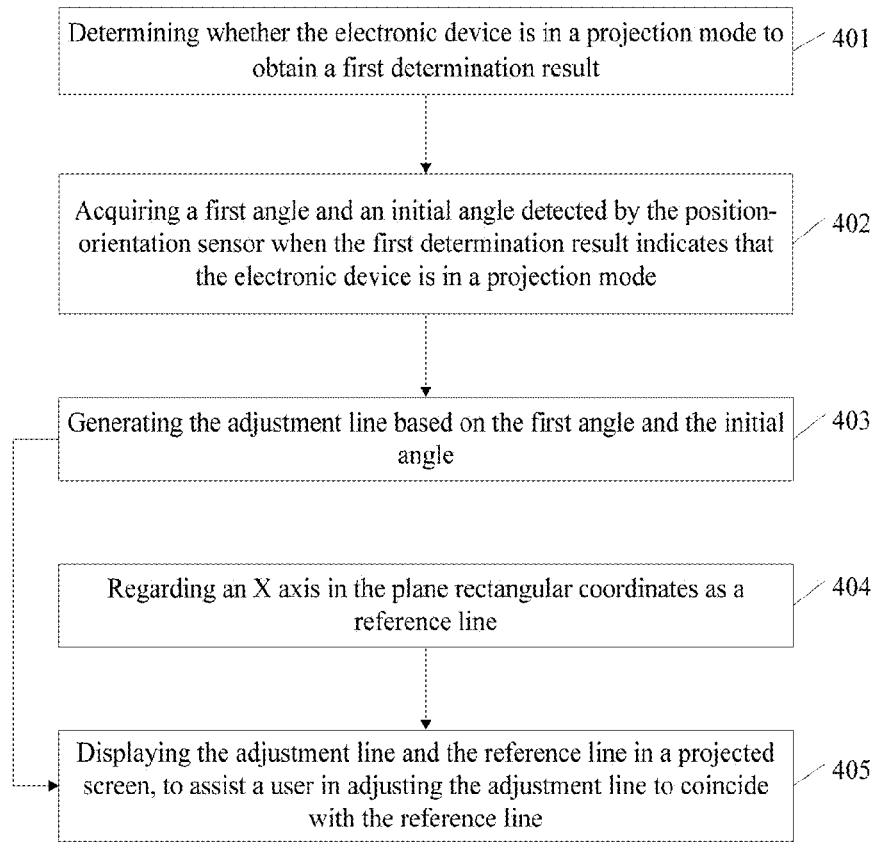
Figures 2, 6:
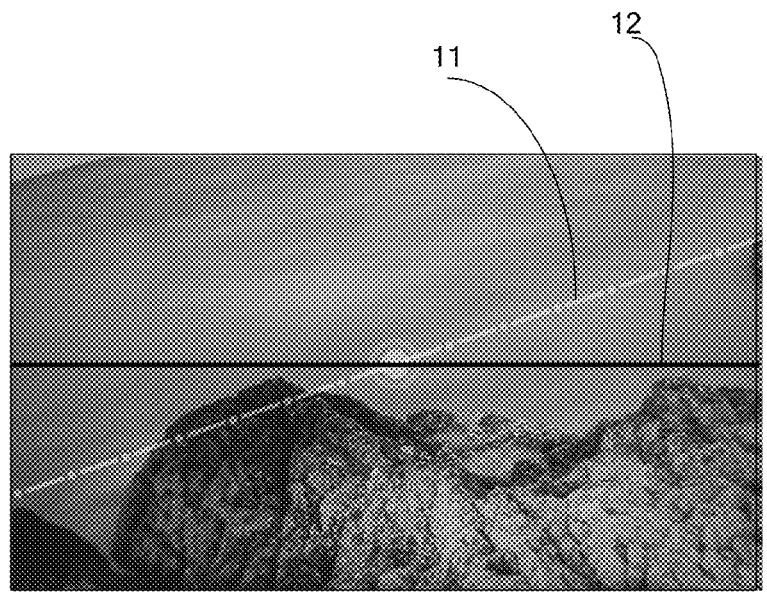

FIG. 6-1 is a schematic diagram of flowchart of implementation of an information processing method in a fourth embodiment of the present application, as shown in FIG. 6-1, the method comprising:

Step 401, determining whether the electronic device is in a projection mode to obtain a first determination result.

Herein, the projection mode refers to that the user turns on the projection function of the electronic device, when turning on the projection function, projection members on the electronic device can project the display content of the electronic device in the form of image, in particular, it is possible to project onto a wall, a tabletop, a floor, a screen and so on.

Step 402, acquiring a first angle and an initial angle detected by the position-orientation sensor when the first determination result indicates that the electronic device is in a projection mode.

Herein, the first angle is an angle between the electronic device and the horizontal plane, the initial angle is an angle between a projection lens in the projection assembly and a horizontal plane.

Step 403, generating the adjustment line based on the first angle and the initial angle.

Herein, the adjustment line is used to represent current position-orientation information of the electronic device.

Step 404, regarding an X axis in the plane rectangular coordinates as a reference line.

Herein, the reference line is associated with an initial angle and used to represent a straight line which serves as a standard generated when the electronic device is in a set position-orientation, wherein the initial angle is an angle between a projection lens in the projection assembly and a horizontal plane.

Step 405, displaying the adjustment line and the reference line in a projected screen, to assist a user in adjusting the adjustment line to coincide with the reference line.

In this embodiment of the present application, step 403, generating the adjustment line based on the first angle and the initial angle comprises:

step 4031, obtaining a difference between the initial angle and the first angle to obtain a second angle;

step 4032, extending two edges of the second angle, coinciding a first edge of the second angle with a positive direction of the X axis of space rectangular coordinates, and coinciding a vertex of the second angle with an origin of the plane rectangular coordinate; and step 4033, regarding a second edge of the second angle as the reference line.

The technical solution provided by this embodiment of the present application may be applied to the following scenarios. FIG. 6-2 is schematic diagram of relationship between a reference line and an adjustment line in the fourth embodiment of the present application, as shown in FIG. 6-2, the preset reference line is a black solid line 12, the generated adjustment line is a white dotted lines 11, when the user is using the projection mode of the electronic device, since the X axis of the plane rectangular coordinates is regarded as the reference line 12, thus the reference line is a horizontal line, however, in FIG. 4-2, it is seen that the reference line is not a horizontal line. In the technical solution provided in this embodiment of the present application, when the reference line 12 is a horizontal line, it can more facilitate the user regulating the adjustment line 11 to coincide with the reference line 12.

Fifth Embodiment

This embodiment of the present application provides an electronic device, respective units in the electronic device, such as a determining unit, a first acquiring unit, a generating unit, a second acquiring unit, and a display unit, and modules included by each unit can be implemented by invoking program codes by a processor in the electronic device, of course, the program codes may be stored in a storage medium of the computer. It should be noted that, besides the processor and the storage medium, the electronic device further comprises a projection assembly and a position-orientation sensor configured to detect position-orientation information of the electronic device. In this embodiment of the present application, the electronic device covers smart phone, tablet computer, notebook computer, desktop computer, table computer, multimedia player, navigation system, personal digital assistant and others.

Figure 7:
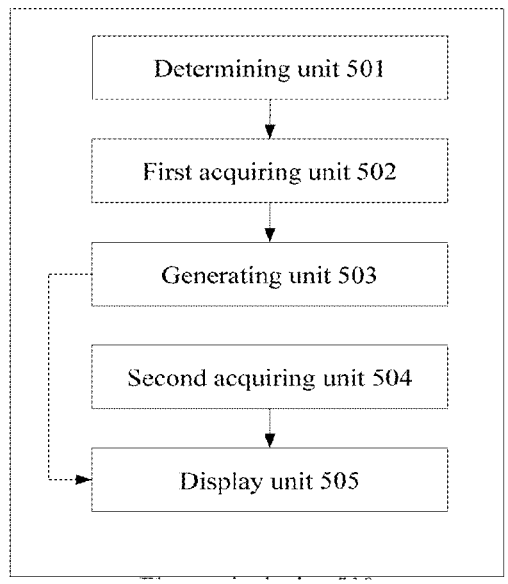
FIG. 7 is a structural schematic diagram of composition of an electronic device according to a fifth embodiment of the present application.

FIG. 7 is a structural schematic diagram of composition of an electronic device according to a fifth embodiment of the present application, as shown in FIG. 7, the electronic device 500 comprises a determining unit 501, a first acquiring unit 502, a generating unit 503, a second acquiring unit 504, and a display unit 505.

The determining unit 501 is configured to determine whether the electronic device is in a projection mode to obtain a first determination result.

Herein, the projection mode refers to that the user turns on the projection function of the electronic device, when turning on the projection function, projection members on the electronic device can project the display content of the electronic device in the form of image, in particular, it is possible to project onto a wall, a tabletop, a floor, a screen and so on.

The first acquiring unit 502 is configured to acquire position-orientation information of the electronic device as detected by the position-orientation sensor when the first determination result indicates that the electronic device is in a projection mode.

Herein, determining whether the electronic device is in a projection mode to obtain a first determination result may comprise acquiring first information, determining whether it is in a projection mode based on the first information, to obtain a first determination result, wherein the first information is used to indicate whether the user turns on the projection function. When the first information indicates that the user turns on the projection function, it is determined that the electronic device is in a projection mode, that is, the first determination result indicates that the electronic device is in a projection mode; when the first information indicates that the electronic device does not turn on the projection function, it is determined that the electronic device is not in a projection mode, that is, the first determination result indicates that the electronic device is not in a projection mode. In a specific implementation, it is possible to implement turning on the projection function in manners of switch button, voice control, selecting by a touch operation.

Herein, determining whether the electronic device is in a projection mode to obtain a first determination result may comprise determining whether the electronic device revokes an application for driving the projection assembly, to obtain a determination result; when the first determination result indicates that the electronic device invokes an application for driving the projection assembly, it shows that the electronic device is in a projection mode; when the first determination result indicates that the electronic device does not invoke an application for driving the projection assembly, then it shows that the electronic device is not in a projection mode.

Herein, the position-orientation information is used to indicate position and/or orientation information of the electronic device, and may be indicated by adopting angle information, those skilled in the art may also adopt other relevant information to indicate the position-orientation information, no more details repeated here.

The generating unit 503 is configured to generate an adjustment line based on the position-orientation information.

Herein, the adjustment line is used to represent current position-orientation information of the electronic device.

The second acquiring unit 504 is configured to acquire a preset reference line.

Herein, the reference line is associated with an initial angle and used to represent a straight line which serves as a standard generated when the electronic device is in a set position-orientation, wherein the initial angle is an angle between a projection lens in the projection assembly and a horizontal plane.

The display unit 505 is configured to display the adjustment line and the reference line in a projected screen, to assist a user in adjusting the adjustment line to coincide with the reference line.

The technical solution provided by this embodiment of the present application may be applied to the following scenarios. FIG. 3-2 is a schematic diagram of relationship between a reference line and an adjustment line in the first embodiment of the present application, as shown in FIG. 3-2, the preset reference line is a black solid line 12, the generated adjustment line is a white dotted lines 11, when the user is using the projection mode of the electronic device, the electronic device 11 automatically generates the adjustment line 11 based on the current position-orientation information of the electronic device, then the user can adjust the position-orientation of the electronic device based on the adjustment line, so that the adjustment line 11 coincides with the reference line 12. During the process of adjusting the electronic device, the adjustment line 11 can move in real time based on the current position-orientation of the electronic device, the user appropriately regulates the adjustment direction based on the movement of the adjustment line 11 to coincide the adjustment line 11 with the reference line 12 as soon as possible.

It should be noted that, typically, it is possible to change the adjustment line by changing the position-orientation of the electronic device, it is assumed that the user adjusts the electronic device by moving up and down, when the user raises a side edge A1 of the electronic device (e.g., block up the side edge A1), if the adjustment line becomes farther and farther away from the reference line, then the user should lower this side edge A1, by which the adjustment line 12 becomes closer and closer to the reference line 11, until the two coincide. Based on the preceding description, as another embodiment of the present application, it is possible to generate prompt information including a direction indicator based on the reference line and the adjustment line, and the prompt information is used to prompt the user to adjust toward the direction indicated by the direction indicator, so that the adjustment line 12 and the reference line 11 coincide.

In this embodiment of the present application, the reference line and the adjustment line may be displayed on a display screen of the electronic device, and may also be displayed in an image projected by the projection assembly.

In this embodiment of the present application, by means of determining whether the electronic device is in a projection mode to obtain a first determination result; when the first determination result indicates that the electronic device is in a projection mode, acquiring position-orientation information of the electronic device as detected by the position-orientation sensor; generating an adjustment line based on the position-orientation information; acquiring a preset reference line; displaying the adjustment line and the reference line in a projected screen, to assist a user in adjusting the adjustment line to coincide with the reference line, it can help the user adjust the display of the screen rapidly, and thereby enhance user experience.

Sixth Embodiment

Based on the preceding embodiment, this embodiment of the present application provides an electronic device, respective units in the electronic device, such as a determining unit, a first acquiring unit, a generating unit, a second acquiring unit, and a display unit, and modules included by each unit can be implemented by invoking program codes by a processor in the electronic device, of course, the program codes may be stored in a storage medium of the computer. It should be noted that, besides the processor and the storage medium, the electronic device further comprises a projection assembly and a position-orientation sensor configured to detect position-orientation information of the electronic device. In this embodiment of the present application, the electronic device covers smart phone, tablet computer, notebook computer, desktop computer, table computer, multi-media player, navigation system, personal digital assistant and others.

Figure 8:
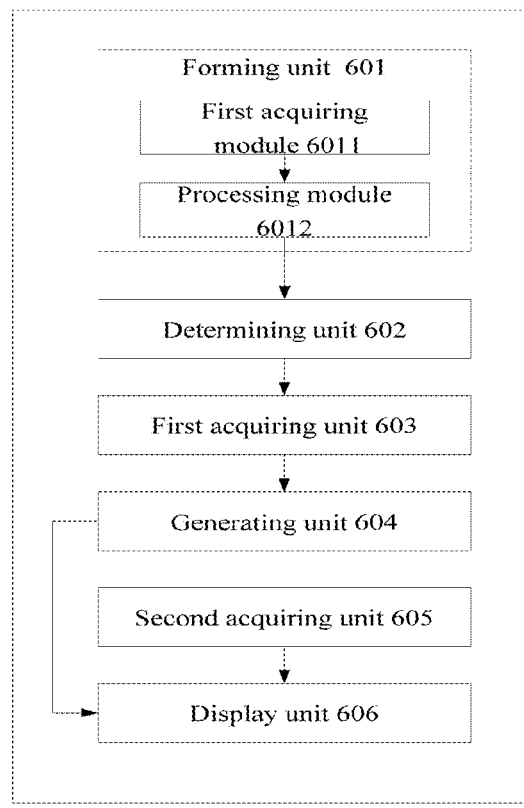
FIG. 8 is a structural schematic diagram of composition of an electronic device according to a sixth embodiment of the present application.

FIG. 8 is a structural schematic diagram of composition of an electronic device according to a sixth embodiment of the present application, as shown in FIG. 8, the electronic device 600 comprises a forming unit 601, a determining unit 602, a first acquiring unit 603, a generating unit 604, a second acquiring unit 605, and a display unit 606, wherein the forming unit 601 comprises a first acquiring module 6011 and a processing module 6012, in which:

the first acquiring module 6011 is configured to acquire the initial angle, the horizontal plane being set to coincide with a positive direction of an X axis of plane rectangular coordinates in a representation process of the initial angle; and the processing module 6012 is configured to extend two edges of the initial angle, coincide a first edge of the initial angle with the X axis of space rectangular coordinates, and coincide a vertex of the initial angle with an origin of the plane rectangular coordinates; and regard a second edge of the initial angle as the reference line.

Herein, the first acquiring module and the processing module may make a reference to FIG. 4-2, in FIG. 4-2, a shows the initial angle σ, b shows the plane rectangular coordinates whose X axis and Y axis both are represented by dotted lines, wherein the arrow of the X axis in the plane rectangular coordinates represents a positive direction of the X axis, the arrow of the Y axis in the plane rectangular coordinates represents a positive direction of the Y axis. If it is set that the initial angle σ is a positive angle, then as shown in c of FIG. 4-3, a first edge of the initial angle σ is coincided with the X axis of the space rectangular coordinates, and a vertex of the initial angle is coincided with an origin of the plane rectangular coordinates, so that the initial angle can be denoted as a positive angle in the plane rectangular coordinates. It should be noted that, in the subsequent embodiments of the present application, besides the initial angle, other angles like first angle may also be involved, wherein the first angle is an angle considered with respect to the positive direction of the X axis, for example, it is assumed that the first angle is −20 degrees, and the initial angle is +15 degrees, then the difference between the first angle and the initial angle is 35 degrees.

The determining unit 602 is configured to determine whether the electronic device is in a projection mode to obtain a first determination result.

Herein, the projection mode refers to that the user turns on the projection function of the electronic device, when turning on the projection function, projection members on the electronic device can project the display content of the electronic device in the form of image, in particular, it is possible to project onto a wall, a tabletop, a floor, a screen and so on.

The first acquiring unit 603 is configured to acquire position-orientation information of the electronic device as detected by the position-orientation sensor when the first determination result indicates that the electronic device is in a projection mode.

The generating unit 604 is configured to generate an adjustment line based on the position-orientation information.

The second acquiring unit 605 is configured to acquire a preset reference line.

The display unit 606 is configured to display the adjustment line and the reference line in a projected screen, to assist a user in adjusting the adjustment line to coincide with the reference line.

Seventh Embodiment

This embodiment of the present application provides an electronic device, respective units in the electronic device, such as a determining unit, a first acquiring unit, a generating unit, a second acquiring unit, and a display unit, and modules included by each unit can be implemented by invoking program codes by a processor in the electronic device, of course, the program codes may be stored in a storage medium of the computer. It should be noted that, besides the processor and the storage medium, the electronic device further comprises a projection assembly and a position-orientation sensor configured to detect position-orientation information of the electronic device. In the embodiment of the present application, the electronic device covers smart phone, tablet computer, notebook computer, desktop computer, table computer, multimedia player, navigation system, personal digital assistant and others.

The electronic device comprises a forming unit, a determining unit, a first acquiring unit, a generating unit, a second acquiring unit, and a display unit, wherein the forming unit comprises a first acquiring module and a processing module, in which:

the first acquiring module is configured to acquire the initial angle, the horizontal plane being set to coincide with a positive direction of an X axis of plane rectangular coordinates in a representation process of the initial angle;

the processing module is configured to extend two edges of the initial angle, coincide a first edge of the initial angle with the X axis of space rectangular coordinates, and coincide a vertex of the initial angle with an origin of the plane rectangular coordinates; and regard a second edge of the initial angle as the reference line;

the determining unit is configured to determine whether the electronic device is in a projection mode to obtain a first determination result.

Herein, the projection mode refers to that the user turns on the projection function of the electronic device, when turning on the projection function, projection members on the electronic device can project the display content of the electronic device in the form of image, in particular, it is possible to project onto a wall, a tabletop, a floor, a screen and so on.

The first acquiring unit is configured to acquire a first angle detected by the position-orientation sensor, the first angle being an angle between the electronic device and the horizontal plane;

to the generating unit is configured to coincide a first edge of the first angle with the positive direction of the X axis of the plane rectangular coordinates; coincide a vertex of the first angle with the origin of the plane rectangular coordinates; and regard a second edge of the first angle as the adjustment line;

the second acquiring unit is configured to acquire a preset reference line; and the display unit is configured to display the adjustment line and the reference line in a projected screen, to assist a user in adjusting the adjustment line to coincide with the reference line.

Eighth Embodiment

This embodiment of the present application provides an electronic device, respective units in the electronic device, such as a determining unit, a first acquiring unit, a generating unit, a second acquiring unit, and a display unit, and modules included by each unit can be implemented by invoking program codes by a processor in the electronic device, of course, the program codes may be stored in a storage medium of the computer. It should be noted that, besides the processor and the storage medium, the electronic device further comprises a projection assembly and a position-orientation sensor configured to detect position-orientation information of the electronic device. In this embodiment of the present application, the electronic device covers smart phone, tablet computer, notebook computer, desktop computer, table computer, multimedia player, navigation system, personal digital assistant and others.

Figure 9:
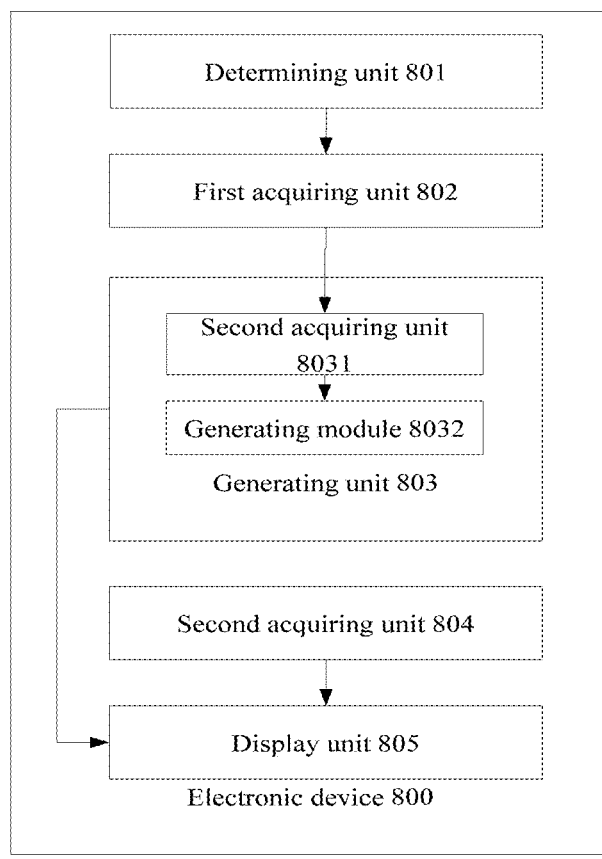
FIG. 9 is a structural schematic diagram of composition of an electronic device according to an eighth embodiment of the present application.

FIG. 9 is a structural schematic diagram of composition of an electronic device according to an eighth embodiment of the present application, as shown in FIG. 9, the electronic device 800 further comprises a determining unit 801, a first acquiring unit 802, a generating unit 803, a second acquiring unit 804, and a display unit 805, wherein the generating unit 803 comprises a second acquiring unit 8031 and a generating module 8032, in which:

the determining unit 801 is configured to determine whether the electronic device is in a projection mode to obtain a first determination result;

the first acquiring module 802 is configured to acquire a first angle detected by the position-orientation sensor, the first angle being an angle between the electronic device and the horizontal plane;

the second acquiring module 8031 is configured to acquire an initial angle, the initial angle being an angle between a projection lens in the projection assembly and a horizontal plane;

the generating module 8032 is configured to generate the adjustment line based on the first angle and the initial angle the second acquiring unit 804 is configured to regard the X axis in the plane rectangular coordinates as a reference line;

the display unit 805 is configured to display the adjustment line and the reference line in a projected screen, to assist a user in adjusting the adjustment line to coincide with the reference line.

In this embodiment of the present application, the generating module 8032 comprises a first processing sub-module, a second processing sub-module, and a third processing sub-module, in which:

the first processing sub-module is configured to obtain a difference between the initial angle and the first angle to obtain a second angle;

the second processing sub-module is configured to extend two edges of the second angle, coincide a first edge of the second angle with a positive direction of the X axis of space rectangular coordinates, and coincide a vertex of the second angle with an origin of the plane rectangular coordinate; and the third processing sub-module is configured to regard a second edge of the second angle as the reference line.

It should be pointed out that the above description of the embodiments of the electronic device are similar to the description of embodiments of the method, and has the same advantageous effects as the method embodiments do, thus no more details repeated. As for the technical details not disclosed in the embodiments of the electronic device of the present application, those skilled in the art can understand with reference to the description of the method embodiments, no more details repeated here in order to save space.

It should be understood that "one embodiment" or "an embodiment" throughout the specification means that particular features, structures, or characteristics related to an embodiment are included in at least one embodiment of the present application. Thus "one embodiment" or "an embodiment" throughout the specification does not necessarily refer to the same embodiment. In addition, these particular features, structures, or characteristics may be combined in any suitable manner in one or more embodiments. It should be appreciated that sequence number of the above respective process does not indicate the execution sequence or priority, execution sequence of the respective process should be determined based on this function and internal logic, and should not make any limitation to the implementation of the embodiments of the present application.

In the several embodiments provided by present application, it should be understood that the device/apparatus and methods disclosed therein may also be implemented by other manners. The above described device/apparatus embodiments are merely illustrative, for example, the unit division is only a logical function division, there may be other division manners in practical implementation, such as: a plurality of units or components may be combined or may be integrated into another system, or some features may be omitted or not executed. In addition, coupling, or direct coupling, or communicative connection between the shown or discussed respective components may be achieved through some interfaces, indirect coupling or communicative connection between devices or units may be electrical, mechanical, or other forms.

Units described above as separate members may be or may not be physically separated, components showed as units may be or may not be physical units; they may be located at one place or distributed to a plurality of network cells; it is possible to select some or all of the units therein to achieve the purpose of solutions in the embodiments according to the actual needs.

Further, respective functional units in the embodiments of the present application may be all integrated in one processing unit and may also be separated as one unit each, or two or more units may also be integrated in one unit; the aforesaid integrated unit may be implemented in the form of hardware or in the form of hardware plus software functional unit.

As will be appreciated by those of ordinary skill in the art: all or part of the steps of the above method embodiments may be completed by instructing relevant hardware through programs, these programs may be stored in a computer readable storage medium, the steps included in the above method embodiments will be executed when the programs are executed; the aforesaid storage medium comprises various mediums capable of storing program codes like a mobile storage device, a Read Only Memory (ROM), a magnetic disk, or an optical disk.

Alternatively, the above integrated units of the present application may also be stored in a computer readable storage medium when being implemented in the form of a software functional module and sold and used as an independent product. Based on such understanding, the substance or the part that contributes to the prior art of the technical solutions of embodiments of the present application may be reflected in the form of a software product, the computer software product may be stored in a storage medium, and comprise several instructions for causing a computer apparatus (which may be a personal computer, a server, or a network device) to fully or partially perform the method described in the various embodiments of the present application. The aforesaid storage medium comprises various mediums capable of storing program codes like a mobile storage device, a Read Only Memory (ROM), a magnetic disk, or an optical disk.

The above described are merely specific implementations of the present application, however, the protection scope of the present application is limited thereto, modifications or replacements that are easily conceivable for those skilled in the art within the technique range disclosed in the present application should all fall into the protection scope of the present application. Therefore, the protection scope of the present application should be based on what is claimed in the claims.

The invention claimed is:

1. An information processing method applied to an electronic device having a projection assembly and a position-orientation sensor configured to detect position-orientation information of the electronic device, the method comprising:
   determining whether the electronic device is in a projection mode to obtain a first determination result;
   acquiring position-orientation information of the electronic device as detected by the position-orientation sensor when the first determination result indicates that the electronic device is in a projection mode;
   generating an adjustment line based on the position-orientation information;
   acquiring a preset reference line; and
   displaying the adjustment line and the reference line in a projected screen, to assist a user in adjusting the adjustment line to coincide with the reference line.

2. The method as claimed in claim 1, wherein the reference line is associated with an initial angle and is used to represent a straight line which serves as a standard generated when the electronic device is in a set position-orientation, the initial angle being an angle between a projection lens in the projection assembly and a horizontal plane.

3. The method as claimed in claim 2, wherein the reference line is formed by:
   acquiring the initial angle, the horizontal plane being set to coincide with a positive direction of an X axis of plane rectangular coordinates in a representation process of the initial angle;
   extending two edges of the initial angle, coinciding with a first edge of the initial angle with the X axis of space rectangular coordinates, and coinciding with a vertex of the initial angle with an origin of the plane rectangular coordinates; and regarding a second edge of the initial angle as the reference line.

4. The method as claimed in claim 3, wherein
the position-orientation information of the electronic device is used to represent an angle between the electronic device and the horizontal plane;
acquiring position-orientation information of the electronic device as detected by the position-orientation sensor comprises acquiring a first angle detected by the position-orientation sensor, the first angle being an angle between the electronic device and the horizontal plane;
generating an adjustment line based on the position-orientation information comprises:
   coinciding a first edge of the first angle with the positive direction of the X axis of the plane rectangular coordinates;
   coinciding a vertex of the first angle with the origin of the plane rectangular coordinates; and
   regarding a second edge of the first angle as the adjustment line.

5. The method as claimed in claim 2, wherein
the position-orientation information of the electronic device is used to represent an angle between the electronic device and the horizontal plane, the horizontal plane is set to coincide with a positive direction of an X axis of plane rectangular coordinates:
acquiring position-orientation information of the electronic device as detected by the position-orientation sensor comprises acquiring a first angle detected by the position-orientation sensor, the first angle being an angle between the electronic device and the horizontal plane;
acquiring a preset reference line comprises regarding the X axis in the plane rectangular coordinates as a reference line;
generating an adjustment line based on the position-orientation information comprises:
   acquiring an initial angle, the initial angle being an angle between a projection lens in the projection assembly and the horizontal plane; and
   generating the adjustment line based on the first angle and the initial angle.

6. The method as claimed claim 5, wherein generating the adjustment line based on the first angle and the initial angle comprises:
   obtaining a difference between the initial angle and the first angle to obtain a second angle;
   extending two edges of the second angle, coinciding a first edge of the second angle with a positive direction of the X axis of space rectangular coordinates, and coinciding a vertex of the second angle with an origin of the plane rectangular coordinate; and
   regarding a second edge of the second angle as the reference line.

7. An electronic device comprising:
a projection assembly,
a position-orientation sensor configured to detect position-orientation information of the electronic device,
a determining unit configured to determine whether the electronic device is in a projection mode to obtain a first determination result;
a first acquiring unit configured to acquire position-orientation information of the electronic device as detected by the position-orientation sensor when the first determination result indicates that the electronic device is in a projection mode;
a generating unit configured to generate an adjustment line based on the position-orientation information;
a second acquiring unit configured to acquire a preset reference line; and
a display unit configured to display the adjustment line and the reference line in a projected screen, to assist a user in adjusting the adjustment line to coincide with the reference line.

8. The electronic device as claimed in claim 7, wherein the reference line is associated with an initial angle and is used to represent a straight line which serves as a standard generated when the electronic device is in a set position-orientation, the initial angle being an angle between a projection lens in the projection assembly and a horizontal plane.

9. The electronic device as claimed in claim 8, wherein the electronic device further comprises a forming unit configured to form the reference line, the forming unit including a first acquiring module and a processing module, in which:
   the first acquiring module is configured to acquire the initial angle, the horizontal plane being set to coincide with a positive direction of an X axis of plane rectangular coordinates in a representation process of the initial angle; and
   the processing module is configured to extend two edges of the initial angle, coincide a first edge of the initial angle with the X axis of space rectangular coordinates, and coincide a vertex of the initial angle with an origin of the plane rectangular coordinates; and regard a second edge of the initial angle as the reference line.

10. The electronic device as claimed in claim 9, wherein
the position-orientation information of the electronic device is used to represent an angle between the electronic device and the horizontal plane;
the first acquiring unit is configured to acquire a first angle detected by the position-orientation sensor, the first angle being an angle between the electronic device and the horizontal plane; and
the generating unit is configured to coincide a first edge of the first angle with the positive direction of the X axis of the plane rectangular coordinates; coincide a vertex of the first angle with the origin of the plane rectangular coordinates; and regard a second edge of the first angle as the adjustment line.

11. The electronic device as claimed in claim 8, wherein
the position-orientation information of the electronic device is used to represent an angle between the electronic device and the horizontal plane, the horizontal plane is set to coincide with a positive direction of an X axis of plane rectangular coordinates;
the first acquiring unit is configured to acquire a first angle detected by the position-orientation sensor, the first angle being an angle between the electronic device and the horizontal plane;
the second acquiring unit is configured to regard the X axis in the plane rectangular coordinates as a reference line;
the generating unit comprises a second acquiring unit and a generating module:
the second acquiring module is configured to acquire an initial angle, the initial angle being an angle between a projection lens in the projection assembly and the horizontal plane; and
the generating module is configured to generate the adjustment line based on the first angle and the initial angle.

12. The electronic device as claimed claim 11, wherein the generating module comprises a first processing sub-module, a second processing sub-module, and a third processing sub-module, in which:
- the first processing sub-module is configured to obtain a difference between the initial angle and the first angle to obtain a second angle;
- the second processing sub-module is configured to extend two edges of the second angle, coincide a first edge of the second angle with a positive direction of the X axis of space rectangular coordinates, and coincide a vertex of the second angle with an origin of the plane rectangular coordinate; and
- the third processing sub-module is configured to regard a second edge of the second angle as the reference line.

* * * * *